Sept. 6, 1932.  F. A. WESTLUND  1,876,371
POULTRY ROOST
Filed April 22, 1931    2 Sheets-Sheet 2
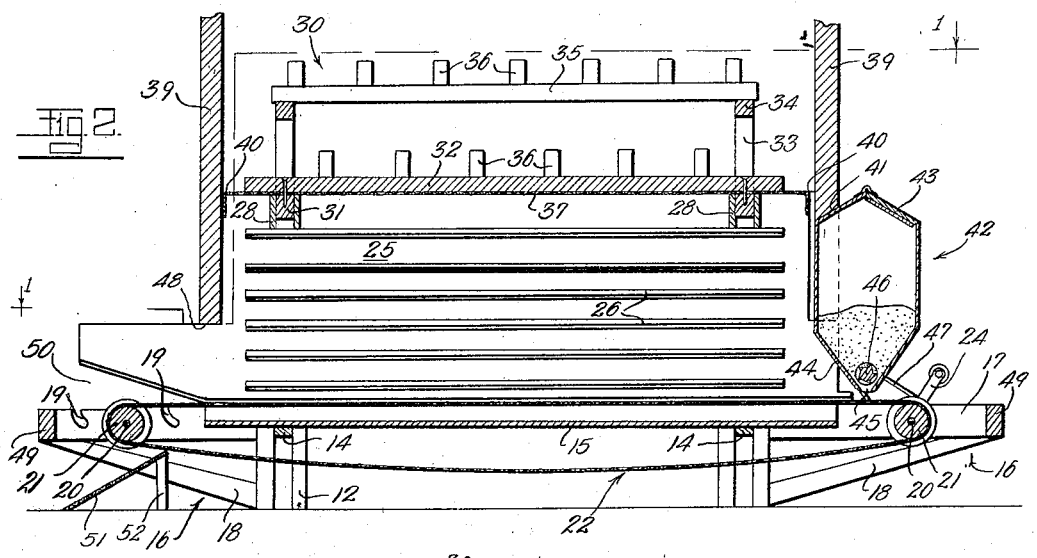
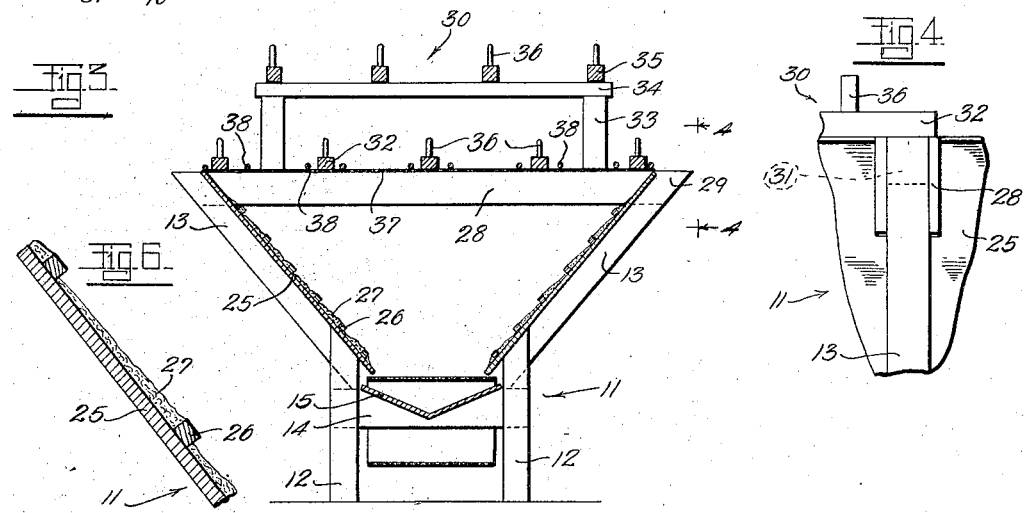
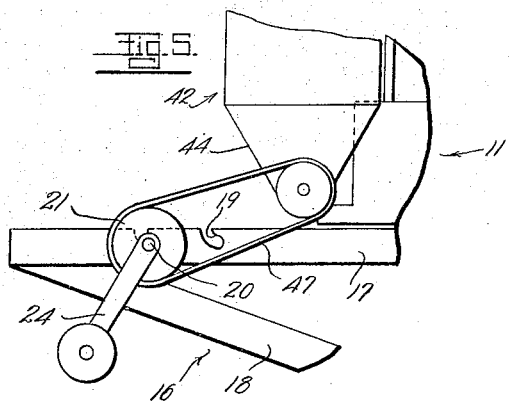
INVENTOR
FRANK A. WESTLUND
BY Hazard and Miller
ATTORNEYS.

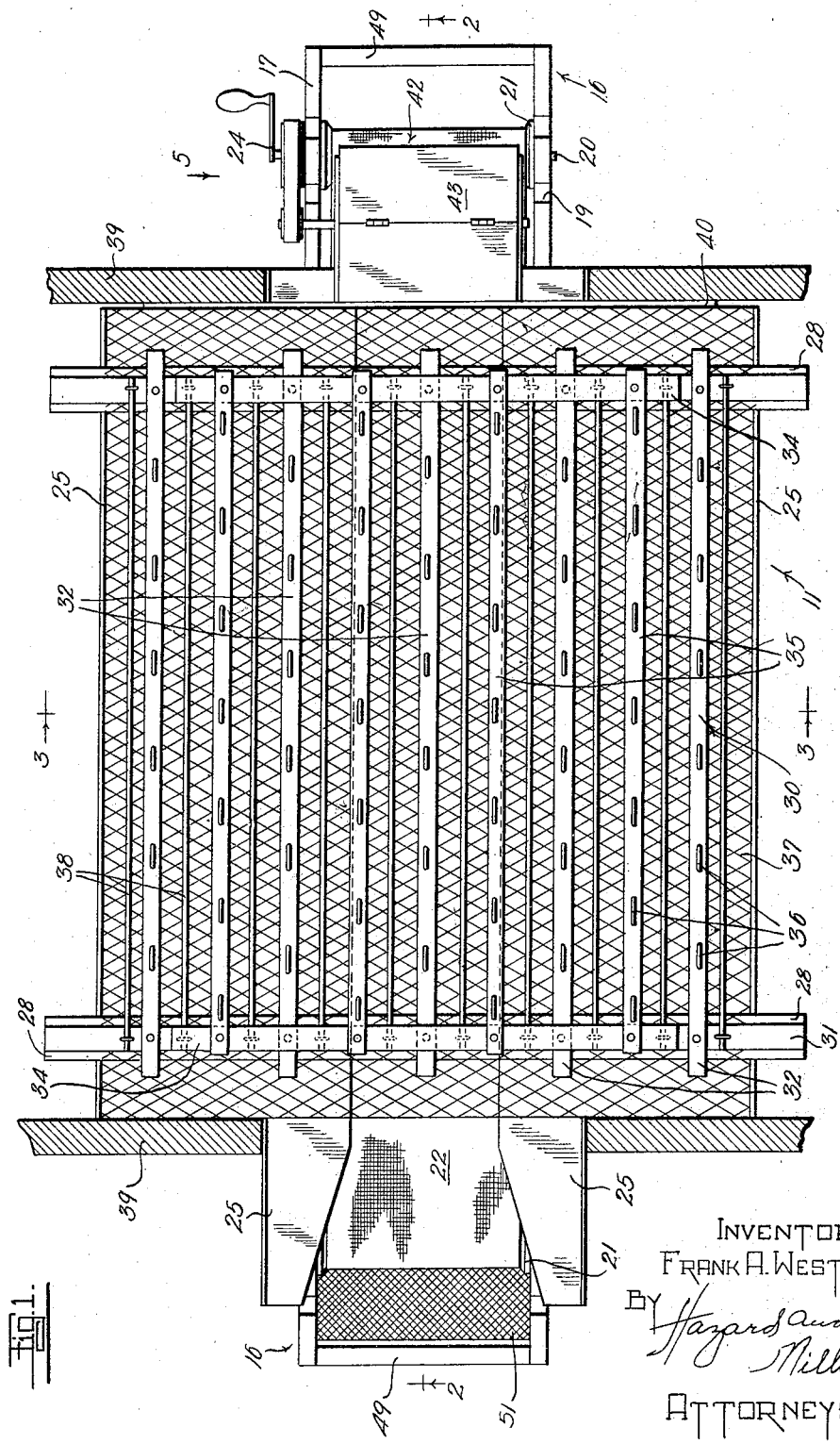

Patented Sept. 6, 1932

1,876,371

UNITED STATES PATENT OFFICE

FRANK A. WESTLUND, OF GLENDALE, CALIFORNIA

POULTRY ROOST

Application filed April 22, 1931. Serial No. 531,927.

An object of my invention in a poultry roost construction relates to the facilities for cleaning the poultry house as well as providing roosts for the poultry, keeping such poultry properly spaced.

Another object and feature of my invention relates to the manner of installing the poultry roost in a poultry house, whereby the roost proper for the poultry is located within the house and the cleaning arrangement is located outside of the poultry house whereby the portion of the poultry house below the roost can be cleaned without the necessity of the operator entering the poultry house itself.

In more detail, another object and feature of my invention is the use of an endless belt conveyor which extends longitudinally below the poultry roosts and on which the droppings may be collected, and by operating the belt these may be moved to one side of the building and then carted away for disposal.

Another detailed feature of my invention comprises placing roosts over a bin or hopper structure with sloping walls, these being side walls and leading downwardly to the upper run of the endless belt whereby all the droppings and cleanings will gravitate to the belt and may be removed by actuating the belt.

Another feature of my invention comprises a sanding device for laying a layer of sand on the belt.

Another detailed feature comprises a screening for the bin to prevent the poultry from getting off the roosts into the bin.

A further detailed feature of my invention consists of employing a granular material on the sloping sides of the bin and on the endless conveyor to receive the droppings and to screen the material from the conveyor and reuse the granular material.

My invention in a single unit device is illustrated in the accompanying drawings, in which:

Fig. 1 is a plan of the poultry roosts illustrating part of a poultry building on the line 1—1 of Fig. 2;

Fig. 2 is a longitudinal section on the line 2—2 of Fig. 1 in the direction of the arrows;

Fig. 3 is a vertical transverse section on the line 3—3 of Fig. 1 in the direction of the arrows;

Fig. 4 is a detailed end view of the bins taken in the direction of the arrows 4 of Fig. 3;

Fig. 5 is a detailed elevation taken in the direction of the arrow 5 of Fig. 1;

Fig. 6 is a detail enlargement of the sloping sides of the bin.

In my construction I employ supporting frames 11 which have a pair of oppositely positioned posts 12, these posts being shown each made of two struts or boards located at each end of the roost for a single unit, and secured to the top of the legs there are sloping braces 13. Transverse beams 14 are connected across at the top of the posts, these being notched out and having a V-shaped floor 15 resting thereon, the floor running lengthwise between the posts 12. At each end of the machine there are end frames 16 formed by longitudinal beams 17 extending outwardly from the end posts and having diagonal braces 18. These end beams have a plurality of notches 19 preferably curved inwardly toward the machine. These notches form journals for the axles 20 of the drums 21, and over the drums there is an endless belt 22. One of the drums has a crank 24 for rotating the drum and, hence, driving the belt. The bin employs side sloping walls 25 which are supported on the sloping braces 13 and on the inside of the sides of the bin there are a series of battens 26, these battens being designed to hold a layer of sand 27. The top of the bin is tied together by the tie straps 28 formed of two boards extending crosswise and passing through the uppermost part of the bin sides and being secured to the side braces 13 by fastenings 29.

The roost structure 30 employs lower cross sills 31 which fit in the space between the tie boards 28, this, preferably, being a loose fit to allow removal of the roost as a unit, if desired. The roost has a lower set of roost bars 32 which are fastened to the lower sills 31. Short posts 33 extend upwardly from the lower sills 31 and have upper sills 34 secured thereto. These upper sills support a series of longitudinal roost bars 35. The upper and lower roost bars are provided with separating pins 36, these being staggered and separating one fowl on each roost bar from the next and so arranged that the fowls on the lower set of roost bars are not directly under the fowls on the upper bars.

A screening 37 of wire mesh fabric covers the top of the bin and is secured to the lower sills 31, there being a series of longitudinal rods 38 to which the screening may be secured, and thus forming a reinforcing strengthening support for the wire fabric. The bin is constructed of such a length that it fits snugly between the sides 39 of the poultry house, and the screening is secured as indicated at 40 to these walls, thus preventing any of the poultry from getting into the bin.

The poultry house at one end has an opening 41 in which is fitted a sand box 42, this box having a lid 43 for filling with sand, a sloping bottom 44, and an opening 45 at the lowermost portion. A sand feeding roll 46 is journaled in the sides of the sand box and driven by a belt 47, which belt is driven by the driven drum 21. At the opposite end of the bin there is an opening 48 in the wall 39 for the projection of the end of the belt and the supporting frames 16 at such end. These supporting frames, preferably, have spacing bars 49 between the beams 17.

In the operation of the device, the sand between the battens on the sloping sides of the bin allows the droppings to roll toward the bottom on to the upper run of the belt 22. This belt is automatically sanded when the crank 24 is rotated and in order to clean the roost structure it is only necessary to rotate this crank sufficiently to carry the upper run of the belt extending underneath the roosts toward the discharge end 50, and the sand and droppings may then be discharged over the end drum into a suitable receptacle.

The various notches 19 allow for adjusting the belt should this become too loose after the initial setup, or if the belt requires cutting and shortening the drums carrying the belt may be shifted inwardly toward each other. The V-shaped bottom boards 15 allow the upper run of the belt to sag and be, in part, supported by these boards.

At the discharge end of the conveyor I utilize a screen 51 which is illustrated as sloping, having one end supported on props 52, and this screen receives the material carried by the conveyor and screens the droppings from the granular material, which latter material may then be used over again.

Fig. 6 illustrates the manner in which the granular material, which may be sand or sawdust or something of a similar nature, is held on the sloping sides of the bin by means of the battens 26. This causes the droppings to roll to the bottom of the bin.

Various changes may be made in the details of construction without departing from the spirit or scope of the invention as defined by the appended claims.

I claim:

1. A poultry roost construction having an elongated bin, a plurality of roost bars positioned above the bin, a screening between the bars and the top of the bin, the bin having an opening at the bottom, a conveyor extending longitudinally through said opening from end to end of the bin, means to operate the conveyor, and means to deposit sand on the conveyor when in operation, said roost bars being positioned in a plurality of tiers one above the other, and separating means positioned in staggered relation one to the other on the upper and lower roost bars to space the poultry in a staggered relation.

2. A poultry roost construction having an elongated bin with outwardly and upwardly sloping sides and open at the bottom, a plurality of roost bars positioned above the bin, an endless conveyor extending longitudinally through the opening in the bottom of the bin, means to support a granular material on the sloping sides of the bin, and means to load the conveyor with a granular material.

3. A poultry roost construction having an elongated bin with upwardly and outwardly sloping sides and open at the bottom, said sides having longitudinal battens, a plurality of roost bars positioned above the bin, an endless belt having its upper run extending longitudinally through the opening from end to end of the bin, means to operate the belt, means to deposit sand on the belt at one end, said means being operative by the movement of the belt, said battens supporting a layer of granular material for the sloping sides of the bin.

4. A poultry roost construction as claimed in claim 3, the discharge end of the belt having a sloping screen positioned below such discharge end.

5. A poultry roost construction having an elongated bin with sloping sides open at the bottom with a conveyor therein, the top of the bin having tie straps connecting opposite sides, roost bars supported on transverse sills, said sills fitting adjacent the tie straps and being readily removable with the roost bars as a unit.

6. A poultry roost construction as claimed in claim 5, the tie straps being arranged in pairs spaced apart, the sills fitting between said pairs and supporting longitudinal roost bars.

7. In a poultry roost construction, an elongated bin having a cleaning conveyor at the bottom, said bin having transverse tie bars arranged in pairs, a transverse sill fitted between each pair of bars and having longitudinal roost bars mounted on the sills, short posts connected to the lower sills and having upper sills thereon with longitudinal roost bars mounted on the upper sills, said lower sills with the roost bars being removable as a unit.

8. In a poultry roost construction, a plurality of lower transverse sills having short posts connecting thereto with upper sills on the posts, longitudinal roost bars on the lower and upper sills, and a spacing means on said roost bars to space the poultry apart in staggered relation.

9. A poultry roost construction having a bin with outwardly and upwardly sloping sides with an opening at the bottom and top, a plurality of roost bars positioned above the bin, and means to support a granular material on the sloping sides of the bin, the open bottom providing means for cleaning the bin.

10. A poultry roost construction having an elongated bin with outwardly and upwardly sloping sides and open at the bottom and at the top, a plurality of roost bars positioned above the bin and extending longitudinally thereof, and means to support a granular material on the sloping sides of the bin, the open bottom providing for cleaning the bin.

11. A poultry roost construction as claimed in claim 10, the means to support the granular material comprising a plurality of battens extending substantially horizontally on the sloping sides.

12. A poultry roost construction having an elongated bin with outwardly and upwardly sloping sides and open at the bottom, a plurality of roost bars positioned above the bin, an endless conveyor extending longitudinally through the opening in the bottom of the bin, and means to support a granular material on the sloping sides of the bin.

13. A poultry roost construction having an elongated bin with upwardly and outwardly sloping sides and open at the bottom, said sides having longitudinal battens, a plurality of roost bars positioned above the bin, an endless belt having its upper run extending longitudinally through the opening from end to end of the bin, means to operate the belt, said battens supporting a layer of granular material on the sloping sides of the bin.

In testimony whereof I have signed my name to this specification.

FRANK A. WESTLUND.